United States Patent

Tang

Patent Number: 5,785,083
Date of Patent: Jul. 28, 1998

[54] TUBULAR REFRIGERANT CHECK VALVE WITH SNAP-TOGETHER INTERNAL VALVE CAGE STRUCTURE

[75] Inventor: Punan Tang, Fort Smith, Ark.

[73] Assignee: Rheem Manufacturing Company, New York, N.Y.

[21] Appl. No.: 815,217

[22] Filed: Mar. 12, 1997

[51] Int. Cl.$^6$ .................................. F16K 15/00
[52] U.S. Cl. .................. 137/533.13; 137/533.15; 137/533.19
[58] Field of Search .................. 137/533.11, 533.13, 137/533.15, 515; 251/68

[56] References Cited

U.S. PATENT DOCUMENTS

| | | | |
|---|---|---|---|
| 720,100 | 2/1903 | Bashlin | |
| 1,353,303 | 9/1920 | Adams | |
| 1,572,858 | 2/1926 | Halsey | |
| 1,648,400 | 11/1927 | Hill | 137/533.13 |
| 2,065,783 | 12/1936 | Woodbridge | 137/533.19 |
| 2,682,281 | 6/1954 | Ecker | 137/533.13 |
| 2,723,679 | 11/1955 | Harris et al. | 137/533.19 |
| 3,059,667 | 10/1962 | Coceano | 137/533.13 |
| 3,263,849 | 8/1966 | Hagen | 137/533.11 |
| 3,387,625 | 6/1968 | Laure | 137/543.19 |
| 4,018,247 | 4/1977 | Carr | 137/512.1 |
| 4,071,045 | 1/1978 | Brandt | 137/533.11 |
| 4,100,935 | 7/1978 | Harnish | 137/533.11 |
| 4,246,002 | 1/1981 | Bell | 137/533.13 |
| 4,286,622 | 9/1981 | Ninomiya et al. | 137/533.11 |
| 4,601,305 | 7/1986 | Nordskog | 137/528 |
| 4,633,681 | 1/1987 | Webber | 62/511 |
| 5,046,526 | 9/1991 | Longmore et al. | 137/515.5 |

*Primary Examiner*—Denise L. Ferensic
*Assistant Examiner*—Joanne Y. Kim
*Attorney, Agent, or Firm*—Konneker & Smith

[57] ABSTRACT

A check valve connectable in a refrigerant line is economically fabricated from only four parts—(1) a copper tubing body connectable in the refrigerant line, (2) a nonmetallic shutoff ball, (3) an annular valve seat member having a diametrically opposite pair of leg portions axially projecting from one end thereof, and (4) an annular stop member also having a diametrically opposite pair of leg portions axially projecting from one end thereof, and further having a diametrically opposite pair of axially extending outer side surface grooves formed therein. The seat and stop members are locked together to form a cage structure by axially press-fitting the valve seat member outer leg ends into the stop member grooves in a manner such that the stop member legs underlie and support the seat member legs, with outer ends of the stop member legs facing a conical seating surface of the seat member in an axially spaced relationship therewith. The shutoff ball is captively retained laterally between the seat member legs for axial movement within the cage structure between an open position in which the ball seals against the seating surface, and an open position in which the ball is axially moved away from the seating surface and is stopped by the outer ends of the stop member legs. The cage is coaxially and captively retained in a longitudinally central portion of the copper tubing body between two elongated, spun-down, reduced diameter end portions thereof that may be soldered into a refrigerant line.

20 Claims, 2 Drawing Sheets

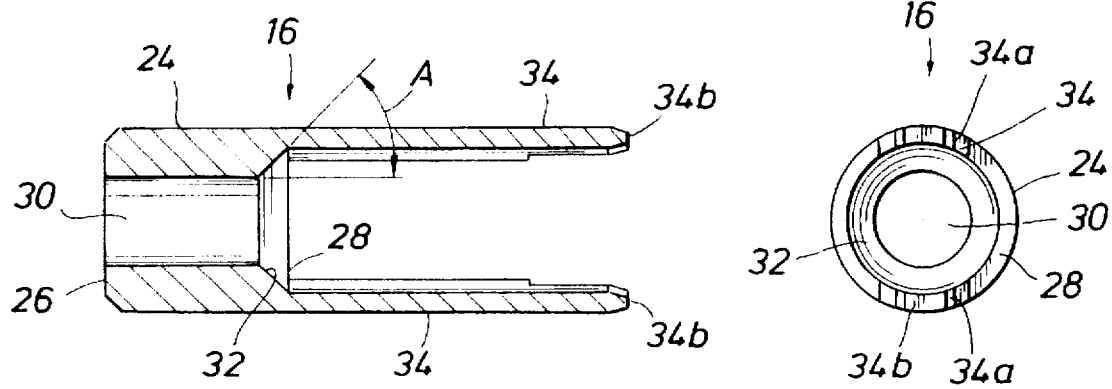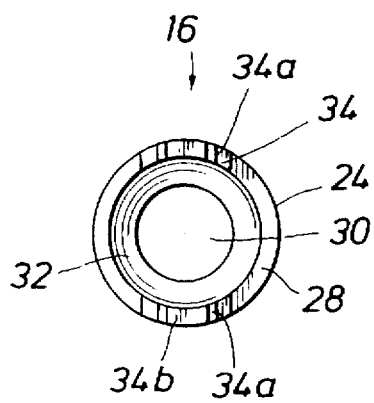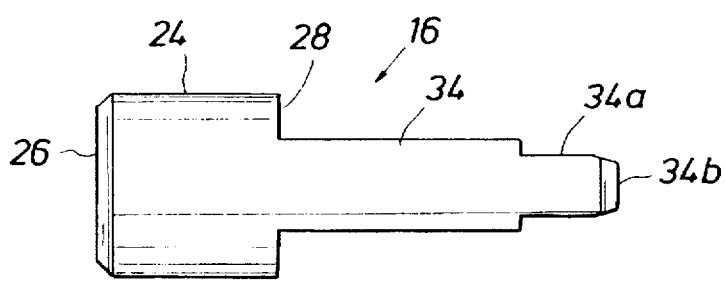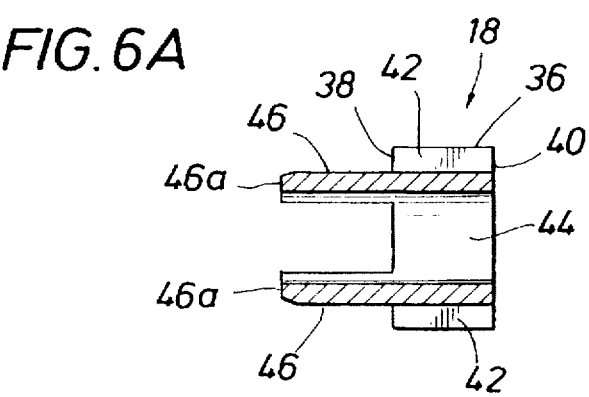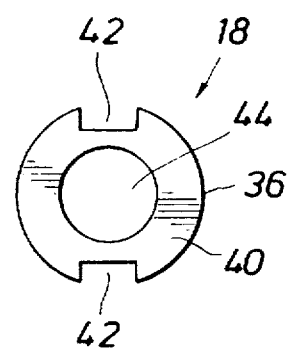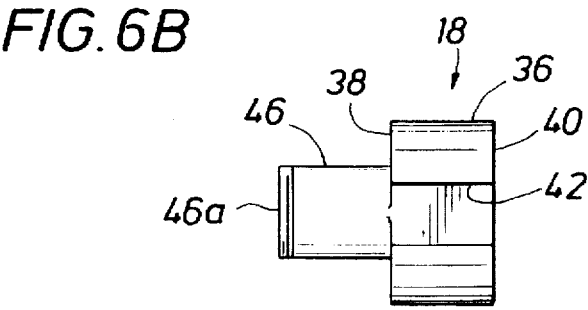

TUBULAR REFRIGERANT CHECK VALVE WITH SNAP-TOGETHER INTERNAL VALVE CAGE STRUCTURE

BACKGROUND OF THE INVENTION

The present invention generally relates to valves and, in a preferred embodiment thereof, more particularly relates to an improved refrigerant check valve.

Various types of check valve structures have been previously proposed for installation in copper refrigerant lines connected to indoor and outdoor coil portions of air conditioning and heat pump units. In this particular flow direction control application, desirable performance characteristics of the check valve include low leakage ratio, small pressure drop, large flow ratio, high working pressure capacity, and low operating noise. From a construction standpoint it is also desirable that the valve be rugged and durable, relatively inexpensive to manufacture and assemble, and be able to withstand relatively high temperatures.

One previous approach to meeting at least some of these performance and construction goals is to captively retain a valve cage structure and associated shutoff ball element in an outer copper tubing member which serves as the outer valve housing and may be appropriately soldered into the copper refrigerant line which the check valve is to serve in its flow direction control capacity. Two representative refrigerant check valves constructed in this general fashion are illustrated and described in U.S. Pat. No. 4,070,045 to Brandt, and U.S. Pat. No. 4,100,935 to Harnish.

While refrigerant check valves such as these tend to be generally satisfactory for their intended purpose, it would be desirable to provide a tubing-based refrigerant check valve structure having improvements in areas such as fabricational economy and simplicity, operational quietness, ruggedness, and heat resistance. It is accordingly an object of the present invention to provide such an improved refrigerant check valve.

SUMMARY OF THE INVENTION

In carrying out principles of the present invention, in accordance with a preferred embodiment thereof, an improved refrigerant check valve is inexpensively formed using only four components—(1) an elongated tubular body structure preferably defined by a continuous or axially segmented length of copper tubing, (2) a valve seat member having an annular body portion with first and second opposite ends, a tapered seating surface extending into the interior of the annular body portion from adjacent the second end thereof and preferably having a tap angle of between eighteen degrees and twenty degrees, and a circumferentially spaced plurality of leg portions extending axially outwardly from the second end and having outer end sections, (3) a stop member having an annular body portion with first and second opposite ends, a circumferentially spaced plurality of axially extending grooves formed in the outer side surface of the stop member body portion, and a circumferentially spaced plurality of leg portions extending axially away from the first end of the stop member body portion and having outer end sections, and (4) a closure member, preferably a nonmetallic closure ball formed from a nylon or plastic material.

The valve seat member and stop member are locked together to form a generally tubular cage structure by axially press-fitting the outer end sections of the seat member legs into the stop member grooves in a manner such that the stop member legs underlie and support the seat member legs, with the outer end sections of the stop member legs facing and being in an axially spaced relationship with the tapered seating surface. The closure ball is laterally retained between the seat member legs for axial movement within the cage structure between a closed position in which the ball seals against the seating surface and prevents fluid flow through the annular body portion of the seating member, and an open position in which the ball is axially shifted away from the seating surface and stopped by the outer end sections of the stop member legs.

The tubular body preferably has a longitudinally central portion positioned between two elongated opposite spun-down end portions having reduced diameters and joined to the longitudinally central portion at radially sloping transition portions of the body. The assembled cage structure, with the closure ball captively retained therein, is coaxially locked within the central portion of the tubular body by placing the cage structure in a longitudinal portion of the tubular body and then spinning down elongated opposite end portions of the body. The lateral reinforcement provided to the seat member legs by the underlying stop member legs, together with the axial press-fit connection between the seat member and the stop member, substantially strengthens the assembled cage to enable the opposite tubular body end portions to be spun down closely adjacent the opposite ends of the inserted cage structure.

The outer ends of the reduced diameter opposite end portions of the tubular outer body are preferably flared to facilitate the soldering of the body into a copper refrigerant line. To protect the nonmetallic closure ball from damage from the soldering process heat, the opposite reduced diameter tubular body end portions are substantially longer than the axial length of the assembled cage structure. Preferably, the lengths of these opposite reduced diameter end portions are approximately twice the axial length of the cage structure.

Despite its simplicity and relatively low cost however, the check valve has the desirable operating characteristics of quiet functioning (due to the nonmetallic ball) in both steady state and transient operation modes, low pressure drop, high flow ratio, high maximum working pressure, and low opening pressure. While the check valve is representatively illustrated as being utilized in a refrigerant circuit application, it will be readily appreciated by those of skill in this particular art that it could also be advantageously used in a variety of other fluid flow control applications if desired.

BRIEF DESCRIPTION OF THE DRAWINGS

FIG. 5A—5C, respectively, are enlarged scale cross-sectional, bottom side elevational and right end views of valve seat member portion of the cage structure; and FIGS. 6A—6C, respectively, are enlarged scale cross-sectional, bottom side elevational and right end views of a ball stop member portion of the cage structure.

DETAILED DESCRIPTION

Figure 1:
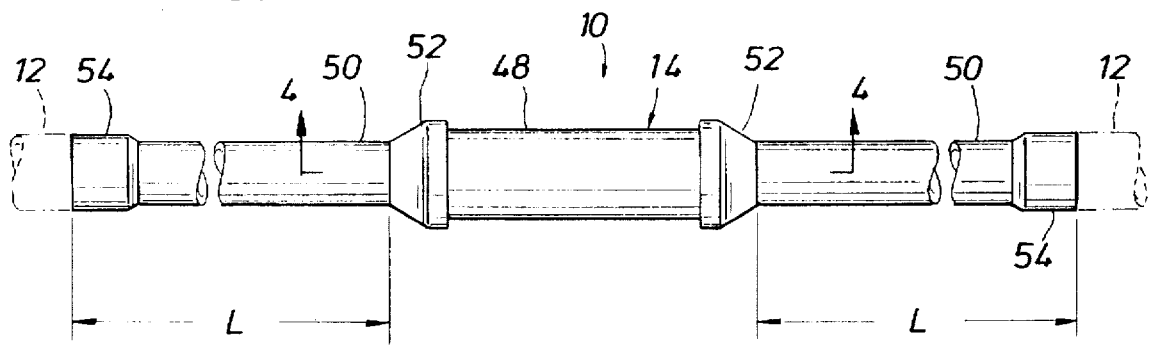
FIG. 1 is a side elevational view of a tubular refrigerant check valve embodying principles of the present invention.
Figure 2:
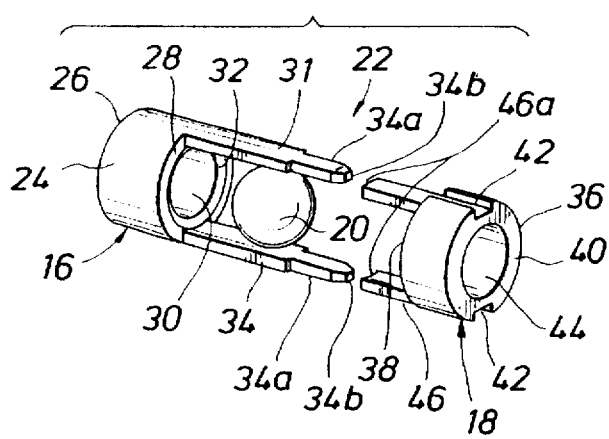
FIG. 2 is a partially exploded perspective view of a specially designed snap-together valve cage structure incorporated in the check valve.
Figure 3:
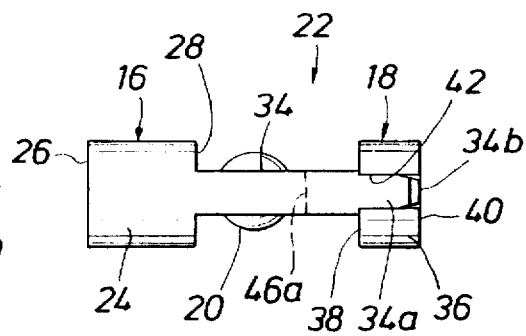
FIG. 3 is a top plan view of the assembled valve cage structure.
Figure 4A:
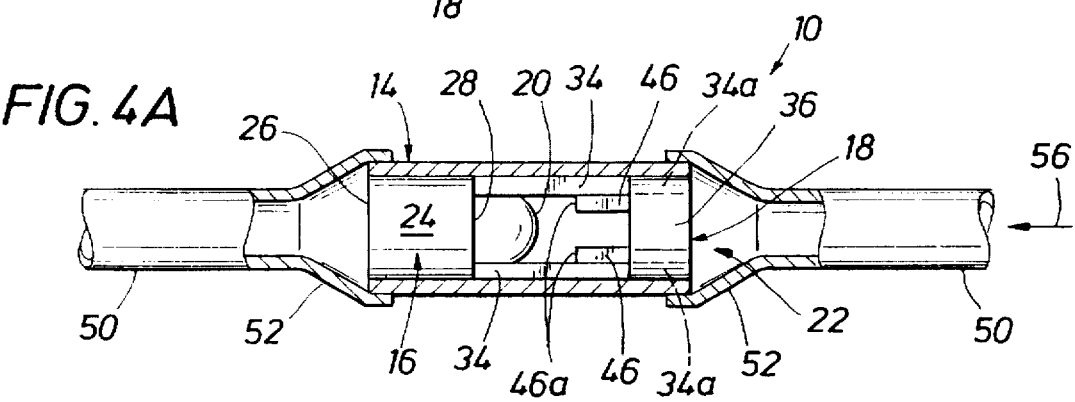
FIGS. 4A and 4B are enlarged scale partial cross-sectional views taken through the valve along line 4—4 of FIG. 1 and respectively illustrate the valve in its closed and open positions.
Figure 4B:
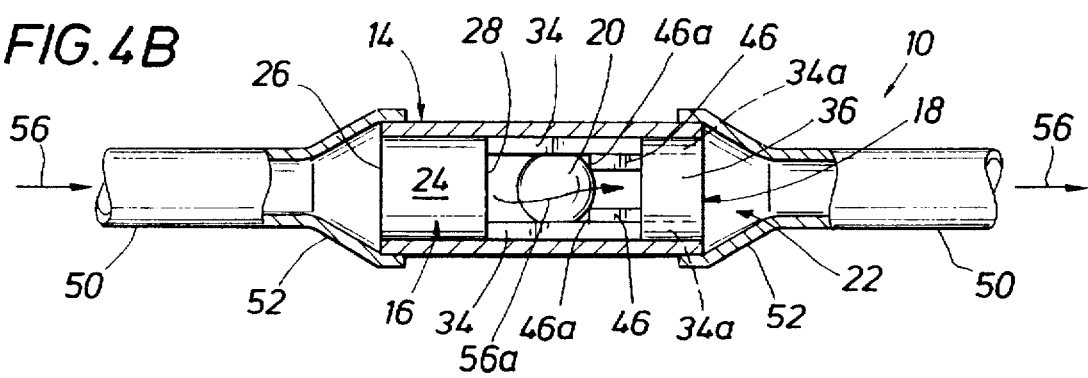

The present invention provides a specially designed, generally tubular check valve 10 (see FIG. 1) that may be coaxially installed in a copper refrigeration line 12 of, for example, an air conditioning or heat pump circuit to automatically permit refrigerant flow through line 12 in a selected direction while precluding flow therethrough in the opposite direction. Check valve 10 is of a very simple construction, consisting of only four parts—(1) a continuous or (as shown) axially segmented length of copper tubing forming a tubular outer body portion 14 of the valve as shown in FIGS. 1, 4A and 4B, (2) a brass valve seat member 16 as shown in FIGS. 5A–5C, (3) a valve stop member 18 as shown in FIGS. 6A–6C, and (4) a nonmetallic closure ball member 20 preferably formed of a plastic or nylon material and shown in FIGS. 2–4C. The seat member 16 and stop member 18 combinatively form a snap-together valve cage structure 22 which is shown in FIGS. 2 and 3 and is locked within the tubular outer body 14 as later described herein.

Referring now to FIGS. 2 and 5A–5C, the valve seat member 16 has an annular body portion 24 with a left end 26, a right end 28, and an axial internal flow passage 30 opening outwardly through the ends 26 and 28. A conically tapered valve seating surface 32 is formed in a right end portion of the passage 32 and has a relatively low tap angle A (see FIG. 5A) of approximately eighteen to twenty degrees. A diametrically opposite pair of laterally curved leg portions 34 extend outwardly from the right body portion end 26 and have outer end portions 34a with reduced circumferential widths and tapered tips 34b.

As illustrated in FIGS. 2 and 6A–6C, the valve stop member 18 has an annular body 36 with left and right ends 38 and 40, a diametrically opposite pair of outer side surface grooves 42 extending between the ends 38 and 40, and an axial flow passage 44 also extending between the ends 38 and 40. A diametrically opposite pair of laterally curved leg portions 46 extend outwardly from the left end 38, are laterally inset from the outer side surface of the body 36, and have outer ends 46a.

With the closure ball 20 placed between the valve seat member leg portions 34 the cage structure 22 (see FIGS. 2 and 3) is formed by axially press-fitting the outer end portions 34a of the legs 34 into the outer side surface grooves 42 in the body 36 of the valve stop member 18. This rigidly locks the valve seat member 16 to the valve stop member 18 in a manner precluding relative axial and rotational movement between these two components. With the leg portions 34a press-fitted into the grooves 42 in this manner, the stop member legs 46 extend parallel to and radially underlie the valve seat member legs 34, as best illustrated in FIGS. 4A and 4B), with the outer stop member leg ends 46a facing the right end 28 of the valve seat member body 16 in an axially spaced relationship therewith.

The stop member legs 46 thus serve to radially brace the valve seat member legs 34 to provide a substantial degree of added rigidity to the overall cage structure 22. Additionally, the outer ends 46a of the stop member legs 46 function to engage the ball 20 in a subsequently described open position thereof and preclude it from moving further away from the stop member seating surface 32.

The lateral distance between the outer side edges of the upper and lower valve seat member legs 34 as viewed in FIGS. 4A and 4B is slightly less than the diameter of the closure ball 20. Accordingly, the ball 20 is captively retained within the cage structure 22 for axial movement therein between its FIG. 4A closed position and its FIG. 4B open position.

After the valve seat member 16 and the stop member 18 are axially press-fitted together as previously described, the finished cage structure 22 (with the closure ball 20 captively retained therein) is coaxially disposed within a longitudinally central portion 48 of the tubular outer body 14, and elongated outer end portions 50 of the outer body 14 are spun down to reduced diameters in a manner forming at the opposite ends of the internal cage structure 22 sloping transition portions 52 of the outer body 14 which axially lock the cage structure 22 within the outer body 14. The rigidity of the specially designed pressed-together cage structure 22 protects it from damage during the forcible laterally inward deformation of the outer body end portions 50.

In the assembled refrigerant check valve 10 shown in FIG. 1, the left and right elongated body end portions 50 are each substantially longer than the axial length of the cage structure 22 within the tubular body 14. Preferably, each of these valve body end portions 50 has a length L which is approximately two times the length of the cage structure 22. The outer ends of the elongated spun-down body end portions 50 are suitably flared, as at 54, to facilitate their solder connection to facing end portions of the refrigerant line 12 shown in FIG. 1. As representatively illustrated, the central body portion 48 is separate from the elongated outer end portions 50. However, as previously mentioned, the overall tubular outer body 14 could alternatively be formed from a single continuous length of copper tubing if desired.

Referring now to FIGS. 4A and 4B, during operation of the refrigerant check valve 10, when refrigerant 56 attempts to flow leftwardly through the valve 10 (see FIG. 4A) the initial refrigerant flow leftwardly drives the ball 20 along the cage structure interior into sealing engagement with the conically tapered valve seat surface 32 to preclude further fluid flow leftwardly through the valve seat member flow passage 30.

A subsequent rightward flow of refrigerant 56 through the valve 10 (see FIG. 4B) drives the ball 20 rightwardly off the valve seat 32 and along the interior of the cage structure 22 until the ball 20 engages and is stopped by the left or outer ends 46a of the stop member legs 46. With the valve to in this open position thereof, bypass flows 56a of refrigerant 56 flow rightwardly around the stopped ball 20 to permit rightward refrigerant flow from the left tubular body end portion 50 into the right tubular body end portion 5o as indicated in FIG. 4B.

As can be seen, the check valve 10 is a very simple construction, having only four parts, and may be quickly and relatively inexpensively assembled. Despite its simplicity and low cost, however, the valve 10 has the desirable operating characteristics of quiet functioning (due to the nonmetallic ball 20) in both steady state and transient operation modes, low pressure drop, high flow ratio, high maximum working pressure, and low opening pressure.

Additionally, the incorporation of the elongated outer body end portions 50 into the finished check valve protects the nonmetallic ball 20 and the valve seat 32 from excess heat which might otherwise be transmitted thereto during soldering of the valve body ends 50 into the associated sections of the refrigerant line 12. While the check valve 10 has been illustrated as being utilized in a refrigerant circuit application, it will be readily appreciated by those of skill in this particular art that it could also be advantageously used in a variety of other fluid flow control applications if desired.

The foregoing detailed description is to be clearly understood as being given by way of illustration and example only, the spirit and scope of the present invention being limited solely by the appended claims.

What is claimed is:

1. Check valve apparatus comprising:

a valve seat member having an annular body portion with first and second opposite ends, a tapered seating surface extending into the interior of said body portion from adjacent said second end thereof, and a circumferentially spaced plurality of leg portions extending axially outwardly from said second end and having outer end sections;

a closure member captively retainable laterally between said leg portions for axial movement relative to said annular body portion toward and away from said seating surface and being sealingly engageable with said seating surface; and a stop member having an annular body portion with first and second opposite ends, a circumferentially spaced plurality of axially extending grooves formed in the outer side surface of said annular body portion of said stop member and configured to axially receive said outer end sections of said leg portions of said valve seat member in a press-fitted relationship therewith, and a circumferentially spaced plurality of leg portions extending axially away from said first end of said stop member body portion and having outer end sections, said stop member leg portions being positioned and configured to underlie and support said valve seat member leg portions when said outer end sections thereof are axially press-fitted into said grooves, with said outer end sections of said stop member leg portions defining stop surfaces for engaging the laterally retained closure member and stopping it a predetermined axial distance away from said seating surface.

2. The check valve apparatus of claim 1 wherein said closure member is a ball formed from a nonmetallic material.

3. The check valve apparatus of claim 2 wherein said ball is of a plastic material.

4. The check valve apparatus of claim 2 wherein said ball is of a nylon material.

5. The check valve apparatus of claim 1 wherein said seating surface is a conically tapered seating surface.

6. The check valve apparatus of claim 5 wherein said conically tapered seating surface has a tap angle within the range of from about eighteen degrees to about twenty degrees.

7. The check valve apparatus of claim 1 wherein said outer end sections of said valve seat member leg portions are press-fitted into said grooves in said stop member body portion, said leg portions of said stop member underlie and support said valve seat leg portions, and said closure member is laterally retained between said valve seat member leg portions for axial movement between said seating surface and said outer end sections of said stop member leg portions.

8. A check valve comprising:

an elongated tubular body;

a generally cylindrical cage structure coaxially retained in said tubular body and including:

a valve seat member having an annular body portion with first and second opposite ends, a tapered seating surface extending into the interior of said annular body portion from adjacent said second end thereof, and a circumferentially spaced plurality of leg portions extending axially outwardly from said second end and having outer end sections, and a stop member having an annular body portion with first and second opposite ends, a circumferentially spaced plurality of axially extending grooves formed in the outer side surface of said annular body portion of said stop member and axially press-fittingly receiving said outer end sections of said valve seat member leg portions, and a circumferentially spaced plurality of leg portions extending axially away from said first end of said stop member body portion and underlying and supporting said valve seat member leg portions, said stop member leg portions having outer end sections facing said second end of said valve seat member body portion in an axially spaced relationship therewith; and a closure member sealingly engageable with said seating surface and being captively retained laterally between said valve seat member leg portions for axial movement between said seating surface and said outer end sections of said stop member leg portions.

9. The check valve of claim 8 wherein said check valve is a refrigerant check valve.

10. The check valve of claim 8 wherein said elongated tubular body has a longitudinally central portion in which said cage structure is coaxially retained, and elongated, reduced diameter opposite end portions.

11. The check valve of claim 10 wherein said elongated tubular body is formed from at least one length of copper tubing.

12. The check valve of claim 11 wherein said opposite tubular body end portions have flared outer ends.

13. The check valve of claim 10 wherein said reduced diameter opposite end portions of said tubular body are spun-down opposite end portions thereof.

14. The check valve of claim 8 wherein the length of each of said reduced diameter opposite end portions is substantially greater than the axial length of said cage structure.

15. The check valve of claim 14 wherein the length of each of said reduced diameter opposite end portions is approximately twice the axial length of said cage structure.

16. The check valve of claim 8 wherein said closure member is a ball formed from a nonmetallic material.

17. The check valve of claim 16 wherein said ball is of a plastic material.

18. The check valve of claim 16 wherein said ball is of a nylon material.

19. The check valve of claim 8 wherein said seating surface is a conically tapered surface.

20. The check valve of claim 19 wherein said conically tapered seating surface has a tap angle within the range of from about eighteen degrees to about twenty degrees.

* * * * *